United States Patent
Mao et al.

(10) Patent No.: US 11,131,902 B2
(45) Date of Patent: Sep. 28, 2021

(54) ELECTRONIC DEVICE AND CAPTURING APPARATUS FOR ELECTRONIC DEVICE

(71) Applicant: JRD COMMUNICATION (SHENZHEN) LTD., Shenzhen (CN)

(72) Inventors: Tao Mao, Shenzhen (CN); Caixia Liu, Shenzhen (CN); Yuxiong Lei, Shenzhen (CN); Bifeng Hu, Shenzhen (CN); Tande Li, Shenzhen (CN); Hao Wang, Shenzhen (CN)

(73) Assignee: JRD COMMUNICATION (SHENZHEN) LTD., Shenzhen (CN)

(*) Notice: Subject to any disclaimer, the term of this patent is extended or adjusted under 35 U.S.C. 154(b) by 0 days.

(21) Appl. No.: 16/852,417

(22) Filed: Apr. 18, 2020

(65) Prior Publication Data

US 2020/0241392 A1 Jul. 30, 2020

Related U.S. Application Data

(63) Continuation of application No. PCT/CN2018/111637, filed on Oct. 24, 2018.

(30) Foreign Application Priority Data

Oct. 24, 2017 (CN) .......................... 201711004503.6

(51) Int. Cl.
*G03B 15/05* (2021.01)
*H04N 5/225* (2006.01)
*H04N 5/235* (2006.01)

(52) U.S. Cl.
CPC .......... *G03B 15/05* (2013.01); *H04N 5/2256* (2013.01); *H04N 5/2354* (2013.01)

(58) Field of Classification Search
None
See application file for complete search history.

(56) References Cited

U.S. PATENT DOCUMENTS 3,610,913 A * 10/1971 Bowen .................. G03B 15/05
362/7
4,423,470 A * 12/1983 Naito ..................... G03B 15/05
362/11
(Continued)

FOREIGN PATENT DOCUMENTS

CN 205485223 U 8/2016
CN 205909198 U 1/2017
(Continued)

OTHER PUBLICATIONS

International search report, PCT/CN2018/111637, dated Jan. 18, 2019 (3 pages).
(Continued)

*Primary Examiner* — William B Perkey

(57) ABSTRACT

A capturing apparatus for an electronic device is provided in the present disclosure. The capturing apparatus for an electronic device may include a lampshade, a camera and a number of flash lamps. The lampshade may include an inner ring portion and an outer ring portion arranged concentrically. An inner rim of the outer ring portion may be connected with an outer rim of the inner ring portion. The camera may be located at a side of the lampshade and corresponding to a hollow area defined by the inner ring portion and positioned at a side of the inner ring portion away from the outer ring portion. A plurality of flash lamps may be disposed at a side of the lampshade close to the camera around a periphery of the camera and corresponding to the outer ring portion.

18 Claims, 2 Drawing Sheets

(56) References Cited

U.S. PATENT DOCUMENTS

| | | | | |
|---|---|---|---|---|
| 2005/0136641 A1* | 6/2005 | Rinne | ...................... | H01L 24/11 438/612 |
| 2005/0254246 A1* | 11/2005 | Huang | .................. | H04N 5/2256 362/362 |
| 2007/0133975 A1* | 6/2007 | Lin | ...................... | H04N 5/2252 396/182 |
| 2007/0206114 A1* | 9/2007 | Tanaka | ................. | H04N 5/2256 348/371 |
| 2012/0039593 A1* | 2/2012 | Yang | ...................... | G03B 15/05 396/175 |
| 2012/0092549 A1* | 4/2012 | Hsu | ...................... | H04N 5/2256 348/374 |
| 2013/0121677 A1* | 5/2013 | Yeh | ........................ | G03B 15/05 396/176 |
| 2013/0287380 A1* | 10/2013 | Thursby | ................. | G02B 17/00 396/19 |
| 2014/0071337 A1* | 3/2014 | Duan | ................... | H04N 5/2256 348/370 |
| 2016/0044217 A1* | 2/2016 | Richardson | ......... | F21V 33/0052 348/207.11 |
| 2016/0088203 A1* | 3/2016 | Maeda | ................ | H04N 5/23229 382/115 |
| 2016/0344913 A1* | 11/2016 | Park | ........................ | B60R 1/00 |
| 2017/0118385 A1* | 4/2017 | Vargas | ................. | G03B 17/561 |
| 2018/0292730 A1* | 10/2018 | Ciabattoni | .............. | G03B 17/14 |
| 2019/0086770 A1* | 3/2019 | Tsujikawa | ............... | G03B 15/05 |

FOREIGN PATENT DOCUMENTS

| | | | | |
|---|---|---|---|---|
| CN | 106412455 A | | 2/2017 | |
| CN | 206575506 U | | 10/2017 | |
| DE | 202011103355 U1 * | | 1/2012 | .............. F21V 21/08 |
| EP | 2814235 A1 | | 12/2014 | |

OTHER PUBLICATIONS

First Office Action from China patent office in a counterpart Chinese patent Application 201711004503.6, dated Aug. 22, 2019 (8 pages).

* cited by examiner

ELECTRONIC DEVICE AND CAPTURING APPARATUS FOR ELECTRONIC DEVICE

CROSS REFERENCE TO RELATED APPLICATIONS

This application is a continuation of International Application No. PCT/CN2018/111637, filed on Oct. 24, 2018, which claims priorities to Chinese Patent Application No. 201711004503.6, filed on Oct. 24, 2017 in the National Intellectual Property Administration of China, the contents of which are herein incorporated by reference in their entireties.

TECHNICAL FIELD

The described embodiments relate to capturing apparatuses, and in particular to a capturing apparatus for an electronic device capable of enhancing effect of filling light and an electronic device.

BACKGROUND

Nowadays, most of electronic devices, such as cellphones, are equipped with cameras. This can satisfy demands of users to take photos. Cameras are usually equipped with flash lamps which can fill light in dark environments such as night.

In general, light emitting diodes (LED) are employed as the flash lamps of electronic products, such as cellphones, due to the low energy consumption and high brightness. The light emitted from light emitting diodes can provide a light supplement for objects being photographed, when the light is insufficient. However, the brightness of the light of light emitting diodes is much lower than that of real flash lamps. In addition, in the mainstream design of the flash lamp in the market, generally, just one flash lamp is located at a side of the camera. Due to the limitation of the light-emitting area and luminous intensity of the flash lamp, there are problems such as insufficient and uneven filling light, resulting in the light from the flash lamp cannot meet requirements for photographing while taking pictures at night and in dark environments, which will impact users' experience.

SUMMARY

To solve the problems existed in the related art, a capturing apparatus for an electronic device with better effect of filling light and an electronic device are provided in the present disclosure.

According to an aspect of the present disclosure, a capturing apparatus for an electronic device is provided and may include a lampshade, a camera and a plurality of flash lamps. The lampshade may include an inner ring portion and an outer ring portion arranged concentrically. An inner rim of the outer ring portion may be connected with an outer rim of the inner ring portion. The camera can be located at a side of the lampshade and corresponding to a hollow area defined by the inner ring portion and positioned at a side of the inner ring portion away from the outer ring portion. The plurality of flash lamps can be disposed at a side of the lampshade close to the camera around a periphery of the camera and corresponding to the outer ring portion. The plurality of flash lamps may be disposed around a periphery of the camera with a same arc length. The inner ring portion may be opaque. The outer ring portion can be transparent and provided with a plurality of scattering parts arranged in a one-to-one correspondence with the plurality of flash lamps. Each scattering part may include a plurality of first circular scattering apertures arranged concentrically. A vertical projection of a circle center of each first circular scattering aperture on an image-capturing face of the camera is overlapped with a vertical projection of a center of a flash lamp in correspondence with the each first circular scattering aperture on the image-capturing face. The outer ring portion may be provided with a plurality of second circular scattering apertures arranged concentrically. A circle center of each second circular scattering aperture can be overlapped with a circle center of the outer ring portion.

According to another aspect of the present disclosure, a capturing apparatus for an electronic device is provided and may include a lampshade, a camera and a plurality of flash lamps. The lampshade may include an inner ring portion and an outer ring portion arranged concentrically. An inner rim of the outer ring portion may be connected with an outer rim of the inner ring portion. The camera can be located at a side of the lampshade and corresponding to a hollow area defined by the inner ring portion and positioned at a side of the inner ring portion away from the outer ring portion. The plurality of flash lamps can be disposed at a side of the lampshade close to the camera around a periphery of the camera and corresponding to the outer ring portion.

According to another aspect of the present disclosure, an electronic device is provided. The electronic device may include a capturing apparatus described above.

BRIEF DESCRIPTION OF THE DRAWINGS

The aspects described above and other aspects, characteristics and advantages of embodiments of the present disclosure will be clearer, with the following description in conjunction with the accompanying drawings, in which.

DETAILED DESCRIPTION

Embodiments of the present disclosure will be illustrated below in detail by referring to the accompanying drawings. However, many different forms can be used to implement the present disclosure which should not be explained to limit to the embodiments described here. On the contrary, the embodiments are provided for the purpose of explaining the principle and practical application of the present disclosure and to get the skill in the art to understand all kinds of embodiments of the present disclosure and modifications suitable for specific expectations.

In the accompanying drawings, shape and size of the elements may be exaggerated and a same mark number will be used to represent a same or similar element, in order to definitely illustrate the present disclosure.

Figure 1:
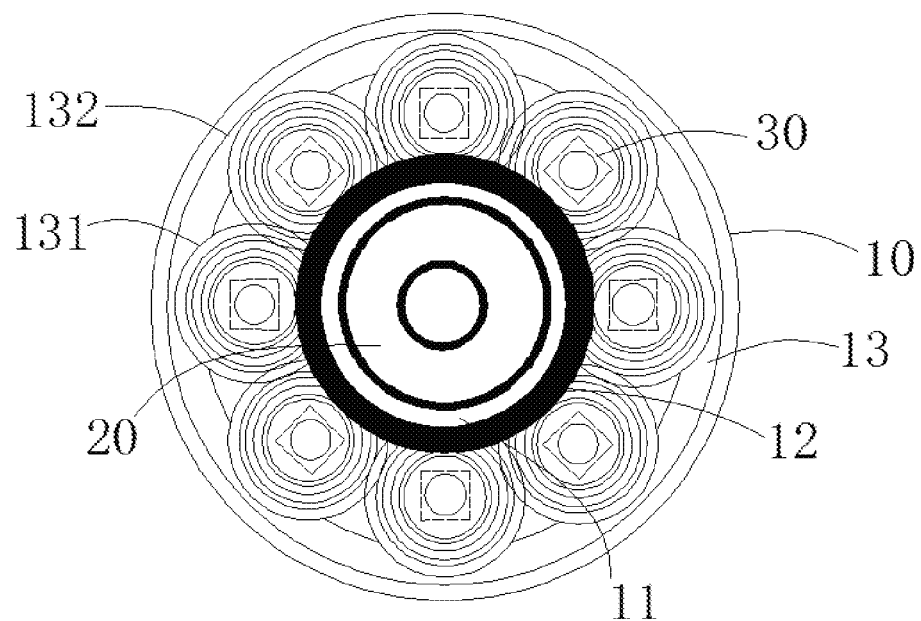
FIG. 1 is a structural schematic view of a capturing apparatus for an electronic device according to an embodiment of the present disclosure.
Figure 2:
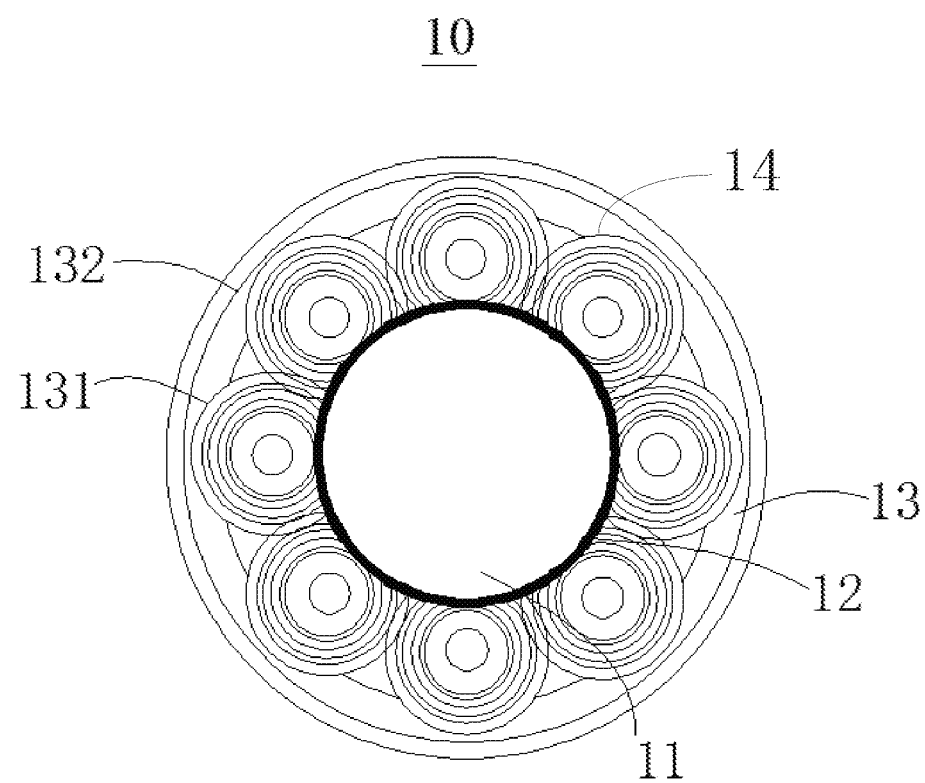
FIG. 2 is a structural schematic view of a lampshade of a capturing apparatus for an electronic device according to an embodiment of the present disclosure.
Figure 3:
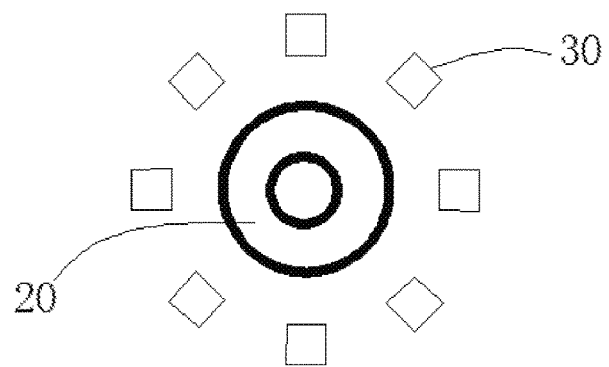
FIG. 3 is a schematic view of position of a flash lamp and a camera of a capturing apparatus for an electronic device according to an embodiment of the present disclosure.

FIG. 1 is a structural schematic view of a capturing apparatus for an electronic device according to an embodiment of the present disclosure. FIG. 2 is a structural schematic view of a lampshade of a capturing apparatus for an electronic device according to an embodiment of the present disclosure. FIG. 3 is a schematic view of position of a flash lamp and a camera of a capturing apparatus for an electronic device according to an embodiment of the present disclosure.

Referring to FIGS. 1-3, the capturing apparatus for an electronic device according to an embodiment of the present disclosure may include a lampshade 10, a camera 20 and a plurality of flash lamps 30. It should be noted that the capturing apparatus for an electronic device according to an embodiment of the present disclosure may further include other necessary parts.

Specifically, the plurality of flash lamps 30 may be arranged around a periphery of the camera 20. Furthermore, for the purpose of even light, the plurality of flash lamps 30 may be disposed around the periphery of the camera 20 with a same arc length. That is, centers of the plurality of flash lamps 30 can form a circle, and arc length formed by centers of each two adjacent flash lamps 30 is equal.

In addition, the number of the plurality of flash lamps 30 according to an embodiment of the present disclosure can be eight. Eight flash lamps 30 may be arranged around the periphery of the camera 20 with the same arc length. Each angle formed by two connecting lines between a center of the lampshade 10 and two centers of each adjacent two flash lamps 30 is equal and is 45°. However, the number of the plurality of flash lamps 30 can be adjusted according to practical necessity and is not limited. In this embodiment, multiple flash lamps 30 are provided, this can enable light-emitting area of the light source formed by the flash lamps larger and light intensity stronger than a single flash lamp. Additionally, since the flash lamps 30 are arranged around the periphery of the camera 20 with an equal arc length, the light source is evenly distributed and the light emitted from the light source is uniform. Moreover, each flash lamp 30 according to the embodiment of the present disclosure may be an LED. It should be noted that LED is suitable for the use as a flash lamp of the capturing apparatus of an electronic device, because of its low energy consumption and high brightness.

The lamp shade 10 according to an embodiment of the present disclosure may include an inner ring portion 12 and an outer ring portion 13 which are arranged concentrically. An inner rim of the outer ring portion 13 can be connected with an outer rim of the inner ring portion 12. The camera 20 may be located at a side of the lampshade 10 and correspond to a hollow area 11 defined by the inner ring portion 12 and positioned at a side of the inner ring portion 12 away from the outer ring portion 13.

Specifically, the inner ring portion 12 may be opaque. The inner ring portion 12 may be operated on a non-light transmission treatment such that light rays cannot be able to travel through, resulting in preventing central area from being too bright to impact the field of view of the camera 20.

Specifically, the outer ring portion 13 may be transparent, such that light rays emitted from the plurality of flash lamps 30 can be scattered through the outer ring portion 13. The outer ring portion 13 may be provided with a plurality of scattering parts 14. The plurality of scattering parts 14 may be arranged in a one-to-one correspondence with the plurality of flash lamps 30. Each scattering part 14 may include a plurality of first circular scattering apertures 131 arranged concentrically. A vertical projection of a circle center of each first circular scattering aperture 131 on an image-capturing face of the camera may be overlapped with a vertical projection of a center of a flash lamp 30 which corresponds to the each first circular scattering aperture 131 on the image-capturing face. What's more, the outer ring portion 13 may be further provided with a plurality of second circular scattering apertures 132 arranged concentrically. A circle center of each second circular scattering aperture 132 may be overlapped with a circle center of the outer ring portion 13. It should be noted that, a portion of the plurality of second circular scattering apertures 132 overlapped with the plurality of first scattered apertures 131 may be removed, and a portion of the plurality of first circular scattering apertures 131 overlapped with the plurality of second circular scattering apertures 132 can be retained.

Figure 4:
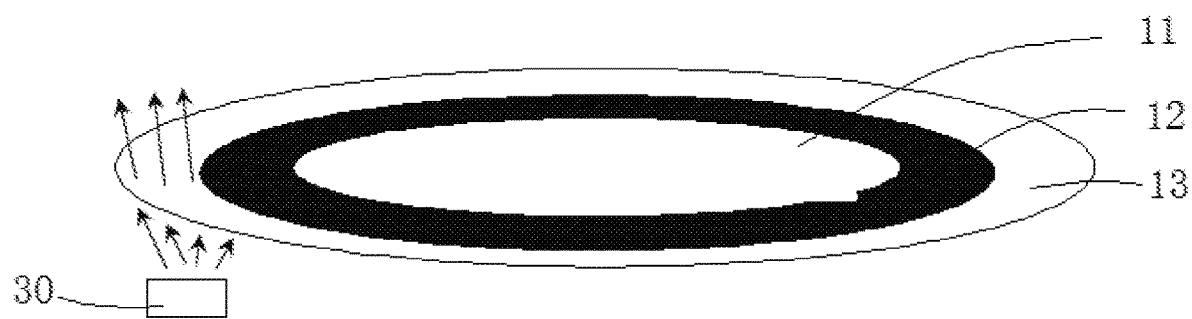
FIG. 4 is a schematic view of a lampshade of the capturing apparatus for an electronic device according to an embodiment of the present disclosure while scattering light.

FIG. 4 is a schematic view of a lampshade of the capturing apparatus for an electronic device according to an embodiment of the present disclosure while scattering light.

The process of light scattering through the lampshade 10 of the capturing apparatus for an electronic device according to an embodiment of the present disclosure will be described below in connection with FIG. 4. The plurality of flash lamps 30 may be disposed at a side of the lampshade 10 close to the camera 20, specifically, may be corresponding to the outer ring portion 13 of the lampshade 10. Generally, the light emitted from the plurality of flash lamps 30 will be scattered to the surroundings without any treatment. However, only those light rays directed toward the object to be photographed in the front can play a role in filling light when taking a picture. Therefore, it is necessary to further treat the light emitted from the plurality of flash lamps 30 so that the light emitted therefrom can be focused on the object to be photographed intensively and uniformly. Thus, in the present disclosure, the plurality of flash lamps 30 may be disposed at the side of the lampshade 10 close to the camera 20 and correspond to the outer ring portion 13 of the lampshade 10. The outer ring portion 13 may be transparent, and a scattering part 14 may be provided on the outer ring portion 13. A plurality of first circular scattering apertures 131 may be provided on the scattering part 14. A plurality of second circular scattering apertures 132 may be further provided on the outer ring portion 13. With the scheme described above, the light emitted from the plurality of flash lamps 30 can pass through the outer ring portion 13 to be scattered under the action of the plurality of first circular scattering apertures 131 and the plurality of second circular scattering apertures 132, and then may be converged forward and focus on the object to be photographed intensively and uniformly, thereby improving the effect of filling light.

An electronic device according to an embodiment of the present disclosure may include the capturing apparatus for an electronic device as shown in FIG. 1. What can be understood is the electronic device according to the embodiment of the present disclosure may further include other necessary parts. In addition, it should be noted that the electronic device according to the embodiment of the present disclosure may include one of a mobile phone, a tablet computer, a notebook computer, and so on.

The process of taking a picture of the electronic device according to an embodiment of the present disclosure will be described below. When the electronic device is used to take pictures at night or in dark environments, the light emitted from eight flash lamps 30 can be intensively and uniformly illuminated on the object to be photographed under the refraction of the plurality of scattering parts 14 of the outer ring portion 13 of the lampshade 10. In this way, light is added to the object to be photographed, and photographing effect of the electronic device at night or in dark environments can be improved.

In summary, in the present disclosure, the plurality of flash lamps 30 may be arranged around the camera 20 to increase the light emitting area and intensity of the plurality of flash lamps 30. The scattering part 14 of the lampshade 10 may be optimized to widen the illumination range and make the light distribution more uniform, thereby enhancing filling light effect of the plurality of flash lamps 30 and improving the photographic effect of the electronic device at night and in dark environments.

Although the invention has been shown and described with reference to specific embodiments, those skilled in the art can understand that various changes in detail and form may be made herein without departing from the spirit and scope of the present disclosure as defined by the claims and their equivalents.

What is claimed is:

1. A capturing apparatus for an electronic device, comprising:
   a lampshade, comprising an inner ring portion and an outer ring portion arranged concentrically, wherein an inner rim of the outer ring portion is connected with an outer rim of the inner ring portion;
   a camera, located at a side of the lampshade, corresponding to a hollow area defined by the inner ring portion and positioned at a side of the inner ring portion away from the outer ring portion;
   a plurality of flash lamps, disposed at a side of the lampshade close to the camera around a periphery of the camera and corresponding to the outer ring portion;
   wherein the plurality of flash lamps is disposed around a periphery of the camera with a same arc length, the inner ring portion is opaque, the outer ring portion is transparent and provided with a plurality of scattering parts arranged in a one-to-one correspondence with the plurality of flash lamps; each scattering part comprise a plurality of first circular scattering apertures arranged concentrically, a vertical projection of a circle center of each first circular scattering aperture on an image-capturing face of the camera is overlapped with a vertical projection of a center of a flash lamp in correspondence with the each first circular scattering aperture on the image-capturing face, the outer ring portion is provided with a plurality of second circular scattering apertures arranged concentrically, a circle center of each second circular scattering aperture is overlapped with a circle center of the outer ring portion.

2. The capturing apparatus for an electronic device according to claim 1, wherein a portion of the plurality of second circular scattering apertures overlapped with the plurality of first scattered apertures is removed.

3. The capturing apparatus for an electronic device according to claim 1, wherein each flash lamp is a light emitting diode.

4. A capturing apparatus for an electronic device, comprising:
   a lampshade, comprising an inner ring portion and an outer ring portion arranged concentrically, wherein an inner rim of the outer ring portion is connected with an outer rim of the inner ring portion;
   a camera, located at a side of the lampshade, corresponding to a hollow area defined by the inner ring portion and positioned at a side of the inner ring portion away from the outer ring portion;
   a plurality of flash lamps, disposed at a side of the lampshade close to the camera around a periphery of the camera and corresponding to the outer ring portion.

5. The capturing apparatus for an electronic device according to claim 4, wherein the inner ring portion is opaque.

6. The capturing apparatus for an electronic device according to claim 4, wherein the outer ring portion is transparent and provided with a plurality of scattering parts arranged in a one-to-one correspondence with the plurality of flash lamps.

7. The capturing apparatus for an electronic device according to claim 6, wherein each scattering part comprise a plurality of first circular scattering apertures arranged concentrically, a vertical projection of a circle center of each first circular scattering aperture on an image-capturing face of the camera is overlapped with a vertical projection of a center of a flash lamp in correspondence with the each first circular scattering aperture on the image-capturing face.

8. The capturing apparatus for an electronic device according to claim 7, wherein the outer ring portion is provided with a plurality of second circular scattering apertures arranged concentrically, a circle center of each second circular scattering aperture is overlapped with a circle center of the outer ring portion.

9. The capturing apparatus for an electronic device according to claim 8, wherein a portion of the plurality of second circular scattering apertures overlapped with the plurality of first scattered apertures is removed.

10. The capturing apparatus for an electronic device according to claim 4, wherein the plurality of flash lamps is disposed around the periphery of the camera with a same arc length.

11. The capturing apparatus for an electronic device according to claim 4, wherein each flash lamp is a light emitting diode.

12. An electronic device, comprising a capturing apparatus, the capturing apparatus comprising:
   a lampshade, comprising an inner ring portion and an outer ring portion arranged concentrically, wherein an inner rim of the outer ring portion is connected with an outer rim of the inner ring portion;
   a camera, located at a side of the lampshade, corresponding to a hollow area defined by the inner ring portion and positioned at a side of the inner ring portion away from the outer ring portion;
   a plurality of flash lamps, disposed at a side of the lampshade close to the camera around a periphery of the camera and corresponding to the outer ring portion;
   the outer ring portion is transparent and provided a plurality of scattering parts arranged in a one-to-one correspondence with the plurality of flash lamps, each scattering part comprises a plurality of first circular scattering apertures arranged concentrically, a vertical projection of a circle center of each first circular scattering aperture on an image-capturing face of the camera is overlapped with a vertical projection of a center of a flash lamp in correspondence with the each first circular scattering aperture on the image-capturing face.

13. The electronic device according to claim 12, wherein the inner ring portion is opaque.

14. The electronic device according to claim 12, wherein the outer ring portion is provided with a plurality of second circular scattering apertures arranged concentrically, a circle center of each second circular scattering aperture is overlapped with a circle center of the outer ring portion.

15. The electronic device according to claim 14, wherein a portion of the plurality of second circular scattering apertures overlapped with the plurality of first scattered apertures is removed.

16. The electronic device according to claim 12, wherein the plurality of flash lamps is disposed around the periphery of the camera with a same arc length.

17. The electronic device according to claim 12, wherein each flash lamp is a light emitting diode.

18. The electronic device according to claim 12, comprising one of a mobile phone, a tablet computer and a notebook computer.

\* \* \* \* \*